United States Patent
McCall et al.

(10) Patent No.: US 6,470,997 B1
(45) Date of Patent: Oct. 29, 2002

(54) APPARATUS AND METHOD FOR ELIMINATING ELECTRICAL NOISE IN THE FIRE DETECT TIMING SIGNAL OF AN AIR GUN

(75) Inventors: David McCall, Richmond, TX (US); Algernon S. Badger, East Bernard, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/847,458

(22) Filed: May 2, 2001

(51) Int. Cl.[7] .................... G01V 1/04; H04R 23/00
(52) U.S. Cl. ............... 181/107; 181/120; 367/144
(58) Field of Search .................. 367/144; 181/107, 181/120

(56) References Cited

U.S. PATENT DOCUMENTS

| 4,034,827 A | 7/1977 | Leerskov, Jr. et al. |
| 4,047,591 A | * 9/1977 | Ward et al. ............. 181/107 |
| 4,240,518 A | 12/1980 | Chelminski |
| 4,301,887 A | * 11/1981 | Fiske, Jr. ............. 181/107 |
| 4,402,382 A | 9/1983 | Mollere |

\* cited by examiner

Primary Examiner—Ian J. Lobo
(74) Attorney, Agent, or Firm—Madan, Mossman & Sriram, P.C.

(57) ABSTRACT

The invention describes an air gun for use in a marine seismic system. The air gun includes a gun body and shuttle that define a chamber containing a compressed supply of gas. The air gun is further designed to release the compressed gas so that the release time or gun fire time is monitored with sufficient accuracy. The fire time is measured by a timing coil that determines the location of the air gun shuttle by sensing a magnet disposed on the shuttle. The timing coil is designed to eliminate interference caused by magnetic flux generated by the actuation of an air gun solenoid valve.

7 Claims, 5 Drawing Sheets

APPARATUS AND METHOD FOR ELIMINATING ELECTRICAL NOISE IN THE FIRE DETECT TIMING SIGNAL OF AN AIR GUN

FIELD OF THE INVENTION

This invention relates to an air gun used in marine seismic exploration systems as a seismic energy source and more particularly to a method and apparatus for determining when the air gun has been fired.

DESCRIPTION OF THE PRIOR ART

Marine seismic exploration systems are used to delineate subsurface geologic formations. In marine exploration, one or more air guns generate acoustic energy that travels toward subsurface formations where it is reflected or refracted back to multiple sensors for measurement. The acoustic energy is developed through release of a volume of compressed air or other suitable gas. The release occurs when an air release valve, usually a solenoid valve, is actuated causing a moving part of the air gun, often referred to as the shuttle, to open allowing the compressed gas to rapidly escape. Typically, multiple air guns are deployed in an air gun array and an air gun controller monitors the firing time of each air gun in the array. The air gun controller also controls solenoid valve actuation so that the respective firing times may be synchronized. Poor array synchronization has an adverse effect on acoustic amplitude leading to poor subsurface resolution.

Several methods for monitoring air gun fire times are well known in the art. One method involves the sensing of movement by the air gun shuttle. This method employs a series of magnets that move with the shuttle and a coil of wire located in a stationary position on the air gun. When the shuttle opens, the magnets in the shuttle approach the coil causing the number of magnetic flux lines encircled by the coil to increase. This action induces a voltage in the coil. The voltage is then monitored to determine the precise firing time of the air gun. This time is used to adjust the firing time of each gun so that the peak acoustic output of all air guns in the array are temporally aligned. An advantage to the coil is that it is a passive sensor with low electrical impedance. The coil apparatus and method above is further described in U.S. Pat. No. 4034827, Air Gun Utilizing Magnetized Shuttle, by Leerskov, Jr. et.al., incorporated herein by reference.

The performance of prior art wire coils tends to be degraded when the triggering solenoid valve generates leakage magnetic flux. The solenoid valve generates a magnetic flux with the application of current thereby inducing a voltage in the wire coil. This induced voltage is unwanted and is present even if the air gun did not fire. The amplitude of this signal is also large in comparison to the signal generated by the firing of the gun resulting in a signal-to-noise ratio of less than 10. A higher signal-to-noise ratio is desirable as the signal may be further degraded when transmitted to signal detection electronics external to the air gun.

Another method used to detect the firing time of an air gun is to use an active pressure transducer to monitor internal gun pressure and a passive hydrophone to monitor external pressure. The measured internal gun pressure corresponds to the actual movement of the air gun shuttle and the measured external pressure represents an acoustic pressure rise resulting from firing the gun. This apparatus and method is further described in U.S. Pat. No. 4240518, incorporated herein by reference.

With an active pressure transducer, power must be applied to the transducer for proper operation. This increases the complexity of the electrical interface to the air gun. Also, the active pressure transducer is a high impedance device whose output is significantly degraded with an increase in electrical leakage. Leakage is common in this application, particularly as electrical conductors age and are exposed to harsh environments. The passive hydrophone used to monitor the acoustic pressure wave is usually mounted external to the air gun and is therefore susceptible to mechanical damage under adverse handling conditions.

Along with the deficiencies mentioned above, both the active pressure transducer and the passive hydrophone are costly to replace and fail frequently. The foregoing deficiencies have created a long-felt need for a robust, passive device that is minimally affected by electrical leakage and by magnetic leakage originating from an adjacent solenoid valve.

Accordingly, it is an object of the present invention to provide an apparatus for accurate and economical detection of air gun firing.

SUMMARY OF THE INVENTION

A new air gun embodying features of the invention includes a body having a longitudinal axis, a shuttle slidably attached to the body to slide along the body in the direction of the longitudinal axis, a magnet attached to the shuttle, a solenoid valve coupled to the end of the body, and a timing coil assembly attached at the end of the body and sensitive to the motion of the at least one magnet and further adapted to minimize the effect of leakage magnetic flux from the solenoid valve.

In a preferred embodiment, the air gun may include a timing coil assembly with a primary coil sensitive to the magnetic flux of the magnets and the solenoid valve, and a secondary coil sensitive to the magnetic flux of the solenoid valve. In another preferred embodiment, the air gun may include the primary coil substantially concentric to the secondary coil. In another preferred embodiment, the air gun may include the primary coil electrically connected in series with the secondary coil. In another preferred embodiment, the air gun may include the primary coil and the secondary coil with a substantially equal number of wire turns.

Also in accordance with the invention there is provided a marine seismic survey system including at least one air gun as described above, a pressurized pneumatic source in pneumatic communication with the at least one air gun, and an air gun controller coupled to the at least one air gun.

Also in accordance with the invention there is provided a method for detecting the firing time of an air gun including generating a first signal in a primary coil sensitive to the actuation of a solenoid valve and the motion of a magnet on a moving shuttle, generating a second signal in a secondary coil sensitive to the actuation of the solenoid valve, and combining the first signal and the second signal into a third signal so as to cancel the effect of the actuation of the solenoid valve on the third signal.

For a better understanding of the present invention, together with other and further objects thereof, reference is made to the following description, taken in conjunction with the accompanying drawings, and its scope will be pointed out in the appending claims.

DESCRIPTION OF THE PREFERRED EMBODIMENT

Figure 1:
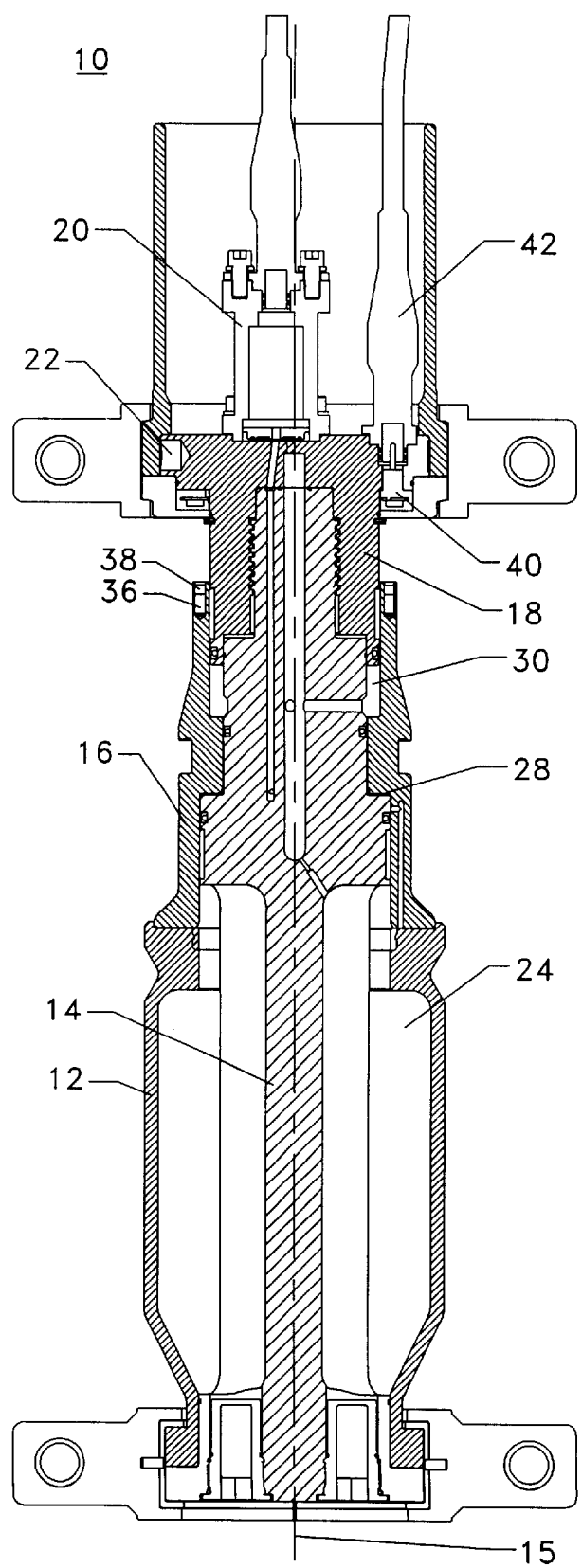
FIG. 1 is a cross-sectional view of an air gun assembly embodying features of the invention, including a timing coil assembly.

FIGS. 1–4 depict an exemplary version of an air gun embodying features of the invention. In FIG. 1, an air gun 10 is provided with a chamber sleeve 12 rigidly attached to a gun body 14 thus defining a main chamber 24. A shuttle 16 slides over the gun body 14 parallel to its longitudinal axis 15 further defining a firing chamber 28 and an air spring return chamber 30. A gun cap 18, also referred to as a stop, is rigidly attached to the gun body 14. A solenoid valve 20 is rigidly mounted to the gun cap 18 and is connected pneumatically to an air intake 22 mounted on the gun cap. Also rigidly mounted to the gun cap 18 are a timing coil assembly 40 and an electrical connector 42. The shuttle 16 includes multiple magnets 36 located around the annulus of the shuttle 16. The magnets 36 are secured with a plug 38.

Figure 2A:
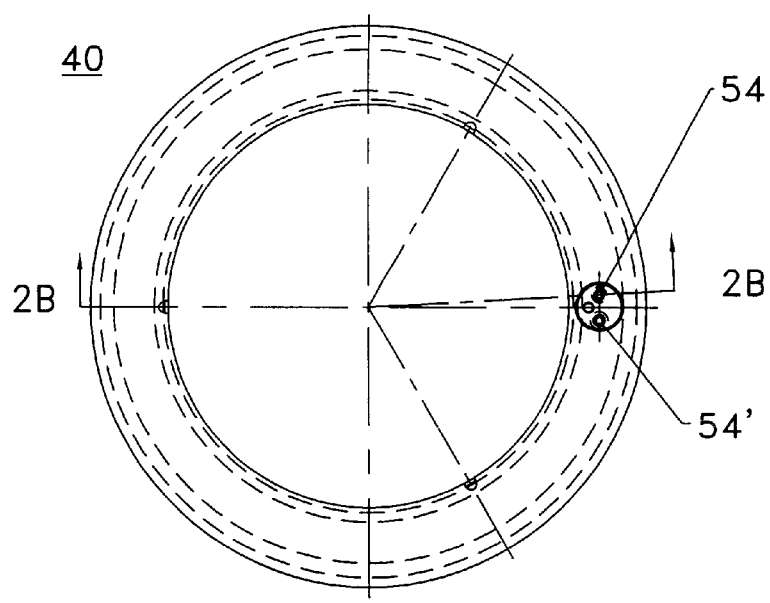
FIG. 2A is a top view of the timing coil assembly of FIG. 1.
Figure 2B:
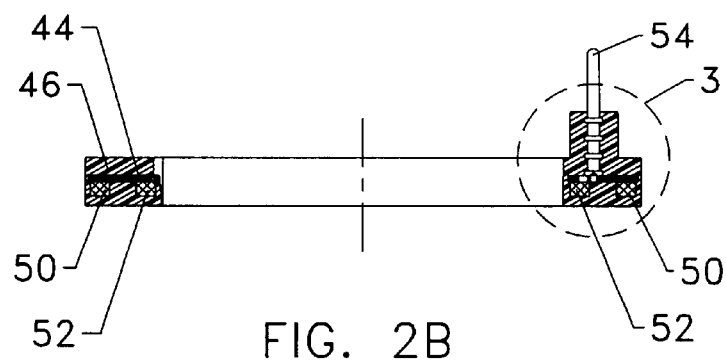
FIG. 2B is a cross-section view of the timing coil assembly of FIG. 2A taken along line 2B—2B.
Figure 3:
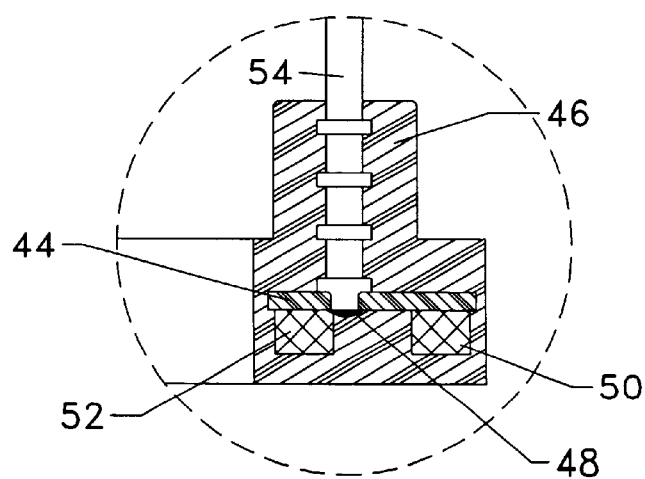
FIG. 3 is an enlarged cross-sectional view of the timing coil of FIG. 2B.

The timing coil assembly 40 is shown in greater detail in FIGS. 2A, 2B and 3. A primary coil 50 is separated from a secondary coil 52 of smaller diameter by an insulating material 46. The primary coil 50 and the secondary coil 52 are concentrically attached to an insulated support 44. The insulated support 44 may be a composite board that is suitable for mounting electronic components. A first end of the secondary coil 52 is electrically connected to a first end of the primary coil 50. The embodiment of FIG. 3 illustrates that a second end of the secondary coil 52 is electrically connected to a first electrical contact pin 54 with solder 48. A second end of the primary coil 50 is electrically connected to a second electrical contact pin 54'. This connection is made by wrapping the wire end of the primary coil 50 around the second electrical contact pin 54'. This connection may be made alternatively through a soldered joint or by another equivalent method. The primary coil 50 and secondary coil 52 are electrically connected in series in reverse polarity. Connection to the electrical connector 42 is made through the electrical contact pins 54 and 54'. The foregoing is encased in an insulating material 46. The preferred insulating material is polyurethane but may be any insulating material such as a thermoplastic elastomer.

Figure 4:
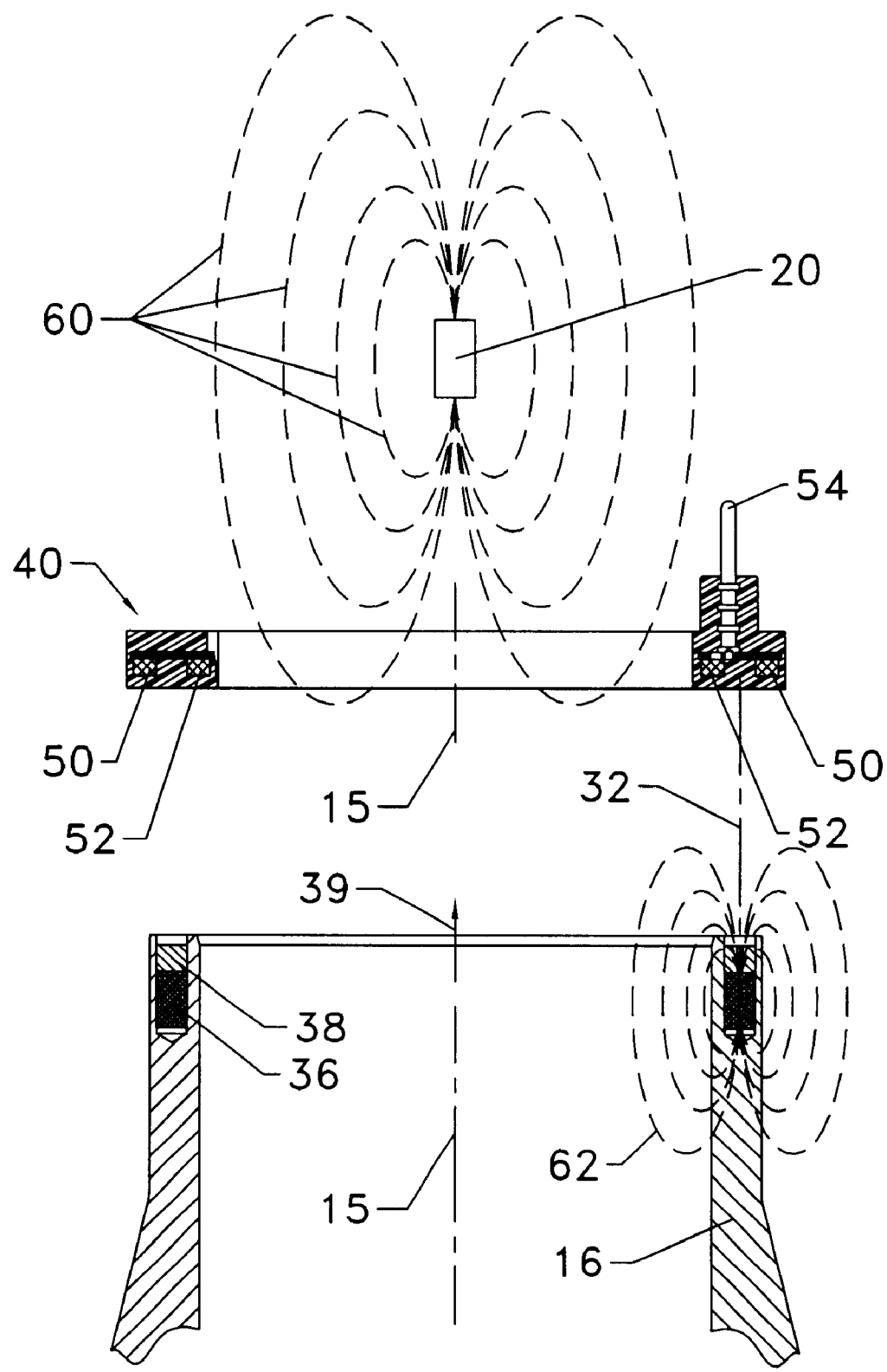
FIG. 4 is a cross-sectional view of the timing coil assembly and the shuttle of FIG. 1 illustrating the magnetic flux generated by the magnets and solenoid valve.

FIG. 4 illustrates how the primary coil 50 and the secondary coil 52 are located with respect to the magnets 36. The annulus midpoint 32 of the magnets 36 is radially located between the primary coil 50 and the secondary coil 52.

The air gun 10 operates by providing a charge of gas, for example air, to the air intake 22. The air intake 22 provides the pressurized gas to the solenoid valve 20, the air spring return chamber 30, and the firing chamber 28. The air gun is fired when the solenoid valve 20 opens to provide air to the firing chamber 28 thus forcing the shuttle 16 to move in the direction of the gun cap 18. Movement caused through charging of the firing chamber 28 causes air in the main chamber 24 to escape and provide a substantial accelerating force against the shuttle 16. The air escapes from the main chamber 24 and the shuttle is returned to the closed position due to trapped air in the air spring return chamber 30.

In the example of FIG. 4, the firing time of an air gun 10 is monitored as the magnets 36 located in the shuttle 16 move in relation to the timing coil assembly 40. The gun body 14 and the gun cap 18 guide the shuttle 16 along the longitudinal axis 15 of the gun body 14. When the air gun 10 fires and the shuttle 16 opens to release the charge of air into the water to create the acoustic pressure wave, the shuttle 16 moves toward the timing coil assembly 40 with a high velocity in the direction of arrow 39. The motion causes a change in the number of magnetic flux lines 62 captured within the circumference of the primary coil 50, which results in an electromotive force being generated in the primary coil 50. The magnitude of the electromotive force is calculated from the following equation:

$$\xi \equiv -N \frac{d\phi}{dt} \tag{1}$$

Where $\xi$ is the electromotive force, N is the number of turns of wire in the coil of the timing coil assembly, and $$\frac{d\phi}{dt}$$

is the time rate of change of the number of magnetic flux lines 62 encompassed by the primary coil 50. The time rate of change of the number of magnetic flux lines 62 is a function of the position of the magnets 36 relative to the timing coil assembly 40 and the velocity of the shuttle 16 relative to the timing coil assembly 40. Substantially all of the magnetic flux lines 62 are encompassed by the primary coil 50, whereas very few are encompassed by the secondary coil 52. The electromotive force by the primary coil 50 and the secondary coil 52 is conveyed to the air gun controller through the electrical connector 42 attached to the air gun 10.

Figure 5:
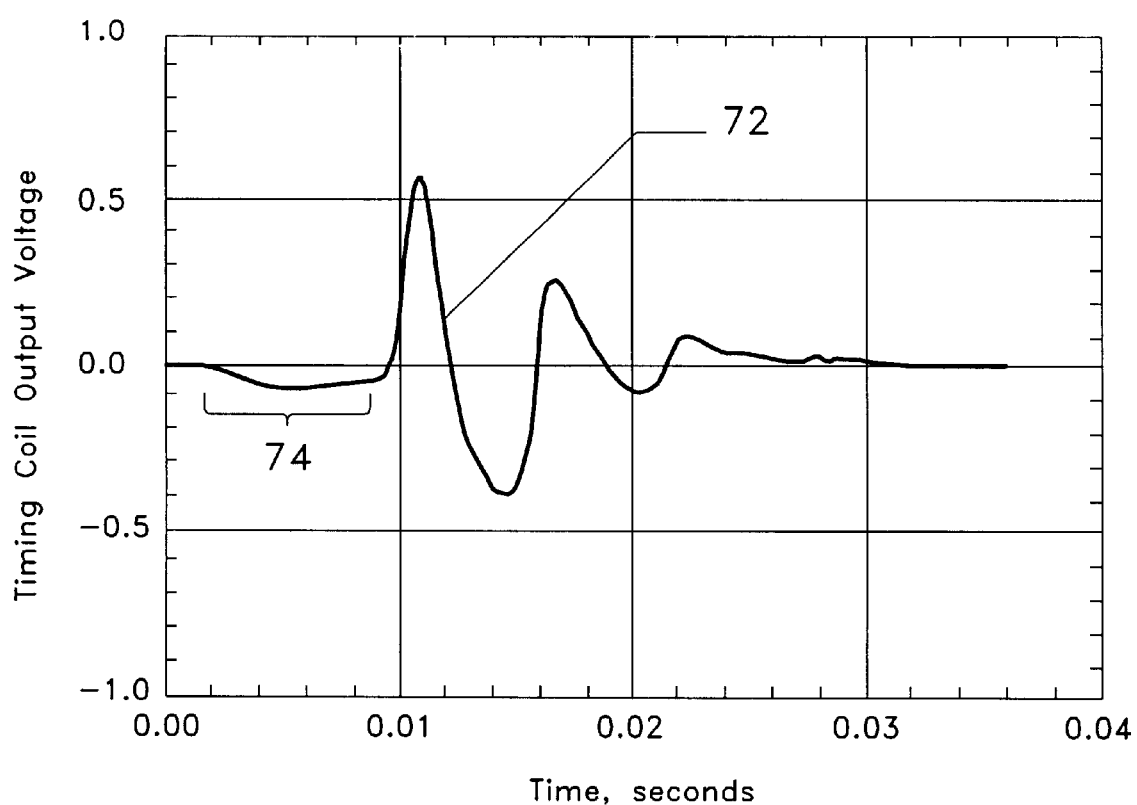
FIG. 5 is a timing coil output voltage waveform that illustrates a precursor signal caused by the actuation of a solenoid valve in a prior art air gun that is eliminated by the timing coil assembly of FIGS. 1–4.
Figure 6:
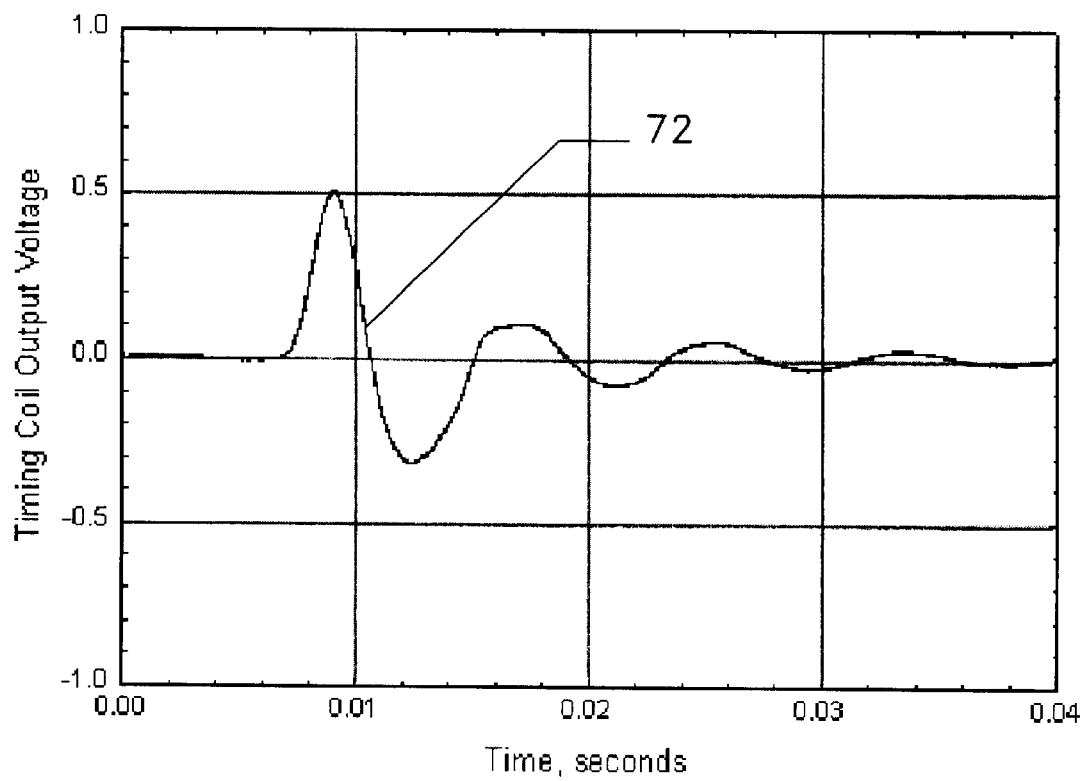
FIG. 6 is a timing coil output voltage waveform of the timing coil assembly of FIGS. 1–4.

In addition to the electromotive force generated by the motion of the magnets, an electromotive force is generated by a change in the leakage magnetic flux 60 from the solenoid valve 20 located above the timing coil assembly 40. In prior art devices, this additional electromotive force causes a precursor signal 74 in addition to the timing coil signal 72 as shown in FIG. 5. In the present invention, however, the electromotive force can be approximately cancelled. As illustrated in FIG. 4, the leakage magnetic flux 60 from the solenoid valve 20 is encompassed by both the primary coil 50 and the secondary coil 52. Also, the primary coil 50 and secondary coil 52 include about the same number of turns and are in close proximity to each other relative to the solenoid valve. Therefore, the electromotive force generated in each coil will be about the same value. The reverse polarity, series arrangement of the coils will sum the electromagnetic force output so that they cancel each other and will provide an output similar to that shown in FIG. 6. FIG. 6 illustrates the timing coil signal 72 similar to that shown in FIG. 5 but without the precursor signal 74.

Although the invention has been described in detail in the reference to a preferred version, other versions are possible. Therefore, the spirit and scope of the claims should not be limited to the preferred version described in detail.

What is claimed is:

1. An air gun comprising:
   (a) a body having a longitudinal axis;
   (b) a shuttle slidably attached to the body to slide along the body in the direction of the longitudinal axis;
   (c) at least one magnet attached to the shuttle;
   (d) a solenoid valve coupled to the end of the body; and
   (e) a timing coil assembly attached at the end of the body, said timing coil assembly sensitive to the motion of the at least one magnet and to leakage magnetic flux from the solenoid valve, wherein the timing coil assembly includes a noise canceling device for substantially canceling noise generated by leakage magnetic flux from said solenoid valve.

2. The air gun of claim 1, wherein the noise canceling device comprises:
   (a) a primary coil sensitive to the magnetic flux of the magnets and the solenoid valve; and
   (b) a secondary coil sensitive to the magnetic flux of the solenoid valve.

3. The air gun of claim 2 wherein the primary coil is substantially concentric to the secondary coil.

4. The air gun of claim 2 wherein the primary coil is electrically connected in series with the secondary coil.

5. The air gun of claim 2 wherein the primary coil and the secondary coil have a substantially equal number of wire turns.

6. Method for detecting the firing time of an air gun comprising the steps of:
   (a) generating a first signal in a primary coil sensitive to the actuation of a solenoid valve and the motion of a magnet on a moving shuttle;
   (b) generating a second signal in a secondary coil sensitive to the actuation of the solenoid valve; and
   (c) combining the first signal and the second signal into a third signal so as to cancel the effect of the actuation of the solenoid valve on the third signal.

7. A marine seismic energy system comprising:
   (a) an air gun including;
      (i) a body having a longitudinal axis;
      (ii) a shuttle slidably attached to the body to slide along the body in the direction of the longitudinal axis;
      (iii) at least one magnet attached to the shuttle;
      (iv) a solenoid valve coupled to the end of the body; and
      (v) a timing coil assembly attached at the end of the body, said timing coil assembly sensitive to the motion of the at least one magnet and to leakage magnetic flux from the solenoid valve, wherein the timing coil assembly includes a noise canceling device for substantially canceling noise generated by leakage magnetic flux from said solenoid valve.
   (b) a pressurized pneumatic source in pneumatic communication with the at least one air gun; and
   (c) an air gun controller coupled to the at least one air gun.

* * * * *